(12) United States Patent
Anderson (10) Patent No.: US 6,199,894 B1
(45) Date of Patent: Mar. 13, 2001

(54) APPARATUS AND METHOD FOR TRUCK FRAME EXTENDER

(76) Inventor: Leonard E. Anderson, 416 Hillcrest, Story City, IA (US) 50248

(*) Notice: Subject to any disclaimer, the term of this patent is extended or adjusted under 35 U.S.C. 154(b) by 0 days.

(21) Appl. No.: 09/092,483

(22) Filed: Jun. 5, 1998

(51) Int. Cl.⁷ .......................... B62D 21/12; B62D 21/14; B62D 61/12
(52) U.S. Cl. .................. 280/638; 280/785; 280/800; 280/767; 280/769; 180/209; 296/26.08
(58) Field of Search .................. 280/638, 656, 280/86.5, 781, 785, 790, 800, 767, 769; 180/208, 209, 311; 296/26.08, 26.09

(56) References Cited

U.S. PATENT DOCUMENTS

| | | |
|---|---|---|
| 1,352,625 | 9/1920 | Pospeshil . |
| 1,565,624 | 12/1925 | Chilton . |
| 1,653,020 | 12/1927 | Oechsle . |
| 2,002,851 | 5/1935 | Divney . |
| 2,468,579 * | 4/1949 | Vuori ................................. 280/638 |
| 2,818,272 | 12/1957 | De Lay . |
| 3,068,038 | 12/1962 | Douglass, Jr. . |
| 3,096,894 | 7/1963 | Proler et al. . |
| 3,240,506 | 3/1966 | McMullen . |
| 3,255,906 | 6/1966 | Proler et al. . |
| 3,362,552 | 1/1968 | Thiele . |
| 3,451,571 | 6/1969 | Brisson . |
| 3,504,814 | 4/1970 | McCleary . |
| 3,520,433 | 7/1970 | Blackburn . |
| 3,604,721 * | 9/1971 | Hulverson ........................... 280/656 |
| 3,664,679 * | 5/1972 | Hille ................................... 280/767 |
| 3,734,223 | 5/1973 | Anderson . |
| 3,752,496 * | 8/1973 | Meinecke, Jr. ..................... 280/767 |
| 3,757,976 | 9/1973 | Van Der Lely . |
| 3,817,545 * | 6/1974 | Ward ................................... 280/638 |
| 3,870,340 * | 3/1975 | Winter ................................. 280/638 |
| 4,040,640 | 8/1977 | Begg . |
| 4,133,571 | 1/1979 | Fillios . |
| 4,239,253 * | 12/1980 | Golze .................................. 280/769 |
| 4,369,902 | 1/1983 | Lampeas . |
| 4,474,526 | 10/1984 | Gevers . |
| 4,487,977 | 12/1984 | Earing, Jr. . |
| 4,522,550 | 6/1985 | Whitehouse . |
| 4,750,855 | 6/1988 | Anderson . |
| 4,856,840 | 8/1989 | Hanley . |
| 4,906,015 * | 3/1990 | LaCroix et al. .................... 280/769 |
| 4,943,204 | 7/1990 | Ehrlich . |
| 5,035,462 | 7/1991 | Page et al. . |
| 5,127,697 | 7/1992 | St. Marie . |
| 5,137,413 | 8/1992 | Ressler . |
| 5,328,320 | 7/1994 | Farrow et al. . |
| 5,456,511 | 10/1995 | Webber . |
| 5,468,038 | 11/1995 | Sauri . |
| 5,501,500 | 3/1996 | Cannon . |
| 5,522,685 * | 6/1996 | Lessard .............................. 296/26.09 |
| 5,562,390 | 10/1996 | Christenson . |

FOREIGN PATENT DOCUMENTS 538925   7/1959   (FR) .

\* cited by examiner

Primary Examiner—Peter C. English
(74) Attorney, Agent, or Firm—Zarley, McKee, Thomte, Voorhees & Sease

(57) ABSTRACT

An extendable truck frame includes extended frame rails and interconnecting members. One end of the extended rails includes a connection that can be received by and secured into the back end of truck frame. In one embodiment, the extended rails can be positioned either at the general level of the truck frame to essentially extend the truck frame in the same general plane as the truck frame, but alternatively can be secured to the truck frame at a different, for example lower, position. The extended frame is releasable by interconnecting mechanisms so that extended frame can be selectively used.

21 Claims, 12 Drawing Sheets

APPARATUS AND METHOD FOR TRUCK FRAME EXTENDER

BACKGROUND OF THE INVENTION

1. Field of the Invention

The present invention relates to motor vehicles, in particular to working trucks, and more particularly, to the supporting frames for such trucks.

2. Problems In The Art

Motorized trucks have innumerable uses. For purposes of the following discussion, the term "working trucks" will be used to mean motor vehicles that are used to accomplish some working function associated with carrying, transporting, or dispensing, or enabling some other work. Examples could include small pick-up trucks to large multi-ton straight trucks.

These types of working trucks conventionally utilize a frame as the primary means for strength and support. Normally such a truck frame consists of generally parallel frame members interconnected by cross members. These frame members are usually made of iron or steel. The number of axles and the strength of the frame members are a function of what the truck is intended to do. For example, trucks that are intended to carry heavy loads or have other heavy duty requirements need stronger frames. They perhaps may need more than two axles.

Similarly, trucks intended to carry large-in-volume loads or heavy loads may require longer frames to accommodate such functions.

Mass market truck designers cannot satisfy every possibility regarding customizing individual trucks for individual uses. Therefore they design a reasonable number of models with a reasonable number of options to try to accommodate the wide variety of desired uses for trucks by the public. However, this does place certain limitations on the uses of each truck. For example, even small pick-up trucks represent a significant expense. While they function satisfactorily for many lighter duty uses, they cannot accomplish some things. There is simply a limit as to the amount of weight and volume they can carry.

By still further example, snowplows are generally heavy duty trucks. However, because their primary function is plowing snow and perhaps spreading sand, they are traditionally configured to be fairly short in length with heavy duty frames. Relatively small dump boxes are placed on the vehicles because sand is quite heavy and therefore large boxes would not be possible. Of course, if larger amounts of sand are to be carried, larger trucks, perhaps with multiple rear axles, are used. However, maneuverability of such trucks is sometimes an issue. Therefore, there are many snow plow trucks that have single rear axles which limits the amount of sand that can be carried but increases maneuverability.

As a practical matter, a short frame for a single rear axle snow plow with a short box, precludes many other uses. Certainly, because snow removal in most locations is a part-of-the-year endeavor, it would be economically prudent to be able to configure the trucks for different uses at other times of the year. Again, however, because the primary function of the trucks is snowplowing, it may be difficult to configure the trucks for other uses and therefore efficiently use what represents a big capital investment throughout the year.

It has therefore been identified that a real need exists in the art for a way to expand the flexibility and function of working trucks. It is therefore a principal object of the present invention to provide an apparatus and method which improves over or solves the problems and deficiencies in the art.

Other objects and features of the invention include:
1. An apparatus and method to increase flexibility and functional use of trucks.
2. An apparatus and method to selectively increase the length of working trucks.
3. An apparatus and method which selectively increases the carrying capacity of trucks.
4. An apparatus and method which increases the functionality of certain trucks.
5. An apparatus and method which is economical and allows more efficient use of trucks.
6. An apparatus and method which is durable.

These and other objects, features, and advantages of the present invention will become more apparent with reference to the accompanying specification and claims.

SUMMARY OF THE INVENTION

The invention relates to an apparatus and method for extending the frame of working trucks. The apparatus consists of an extended framework including generally parallel spaced apart extension rails having proximal and distal ends, the extension rails being interconnected by cross members. The proximal ends of the extension rails include connectors for releasable connection to the rear end of a truck frame. The extender frame can then be selectively added or detached to the truck and allows additional carrying capacity or additional functionality for the truck.

The apparatus according to the invention can further include the combination of the extender frame with a truck. The rear end of the frame of the truck includes receivers which receive the proximal end of the connections on the extension rails and removably connect the extender frame to the truck.

The method according to the invention includes the steps of strengthening the truck frame rails at the rear of the truck, inserting interlinking members into the strengthened rear end rear frame rail ends of the truck, extending extension frame rails from the interlinking members to provide an extended frame for the truck.

DETAILED DESCRIPTION OF THE PREFERRED EMBODIMENT

To better understand the invention, preferred embodiments of the invention will now be described in detail. It is to be understood that these embodiments are exemplary only.

Frequent reference will be taken to the drawings. References numerals will be used to indicate certain parts and locations throughout the drawings. The same reference numerals will indicate the same parts and locations throughout the drawings unless otherwise indicated.

Figure 1:
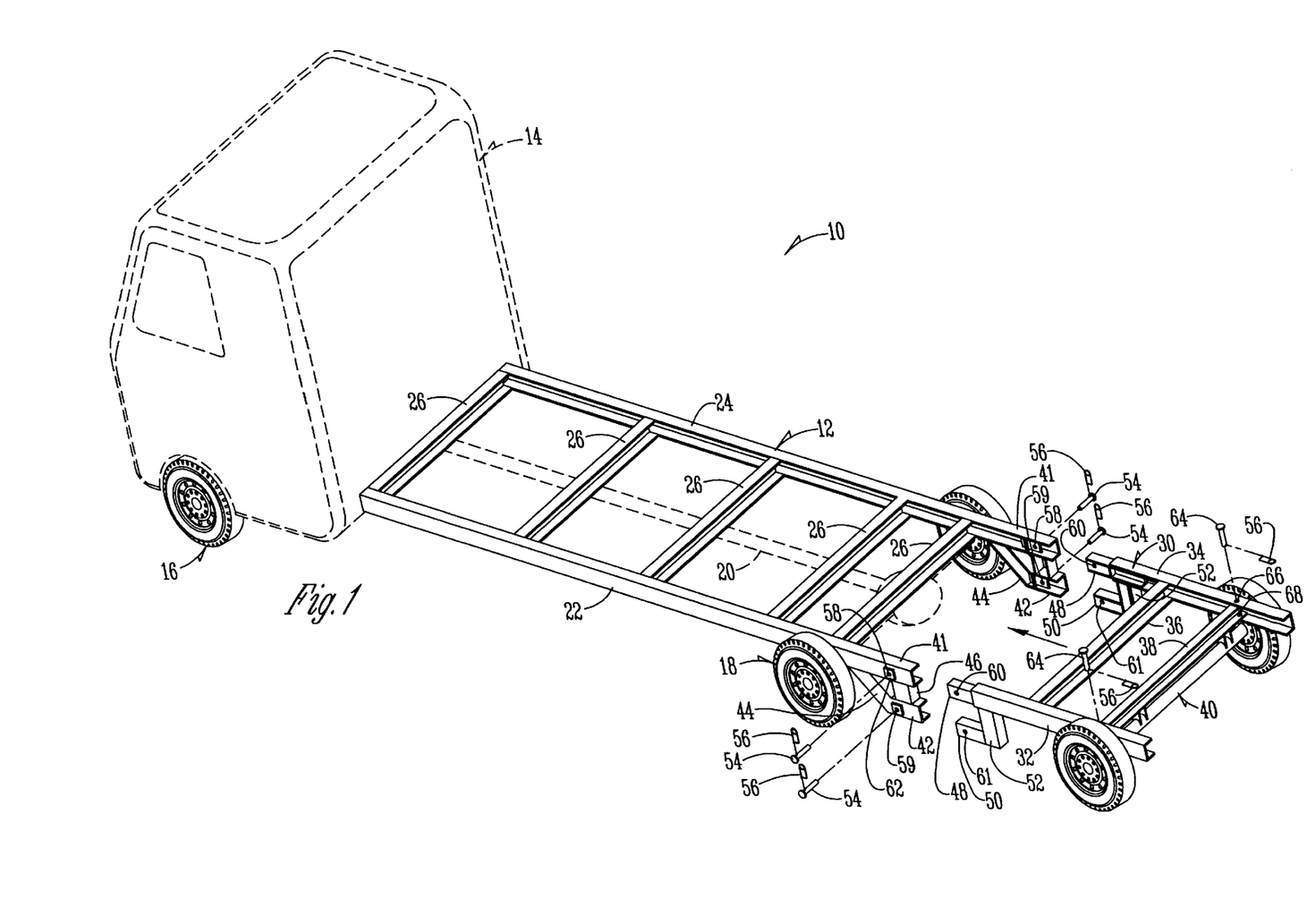
FIG. 1 is a simplified perspective view of an embodiment of an extended truck frame according to the present invention, where the extended truck frame is shown detached from the truck.

FIG. 1 shows a straight truck 10 having a frame 12, a cab 14, a front axle and wheels 16 and a rear axle and wheels 18. A drive train 20 is shown in dashed lines in simplified fashion, connecting the engine (not shown) with the driven rear axle and wheels 18.

As is conventional, and is as shown in simplified form, frame 12 includes parallel C-shaped steel frame rails 22 and 24. Steel cross beams or members 26 interconnect rails 22 and 24 along the length of frame 12.

(Denoted generally at an extended frame 30), according to the present invention is also shown in FIG. 1 in a detached position. Extended frame 30 includes (similarly to truck frame 12) parallel spaced apart frame rails 32 and 34 with interconnecting cross beams 36 and 38. A non-driven axle and wheels 40 is connected to frame 30.

As shown in FIG. 1, the rear of truck frame 12 includes a receiver mechanism for cooperating complimentary members at the front or proximal end of extended frame 30. In particular, the very rear ends 41 of truck frame rails 22 and 24 are open. Additionally, similar-in-structure bottom receivers 42, connected to the rear end of truck frame 12 by members 44 and 46, represent receivers for male members 48 and 50 of extended frame 30. Male members 50 are spaced apart from male members 48 by member 52. As also generally illustrated in FIG. 1, once male members 48 and 50 are inserted into top and bottom receivers 41 and 42 of truck frame 12, pins 54 can be inserted through apertures 58, 59, 60 and 61, as shown, and locks 56 can be placed through wear bushings 62 attached to the side of frame 12 to lock pins 54 into place and rigidly hold extended frame 30 in place to truck frame 12.

By reverse process, pins 54 can be removed and extended frame 30 removed.

FIG. 1 also shows that cross members 36 and 38 for extended frame 30 can be connected to extended frame rails 30 by placing pins 64 through aligned holes 66 and 68 (on both sides of frame 30) and frame rails 32 and 34 and cross members or beams 36 and 38 respectively. Some type of lock (like locks 56) would be utilized to lock pins 64 in place. Alternatively, cross members 36 and 38 could be welded or otherwise secured to extended frame rails 32 and 34.

FIG. 1 therefore shows an extended frame 30 that essentially simulates frame 12 but releasably allows an enlargement or lengthening of frame 12 of truck 10.

Figure 2:
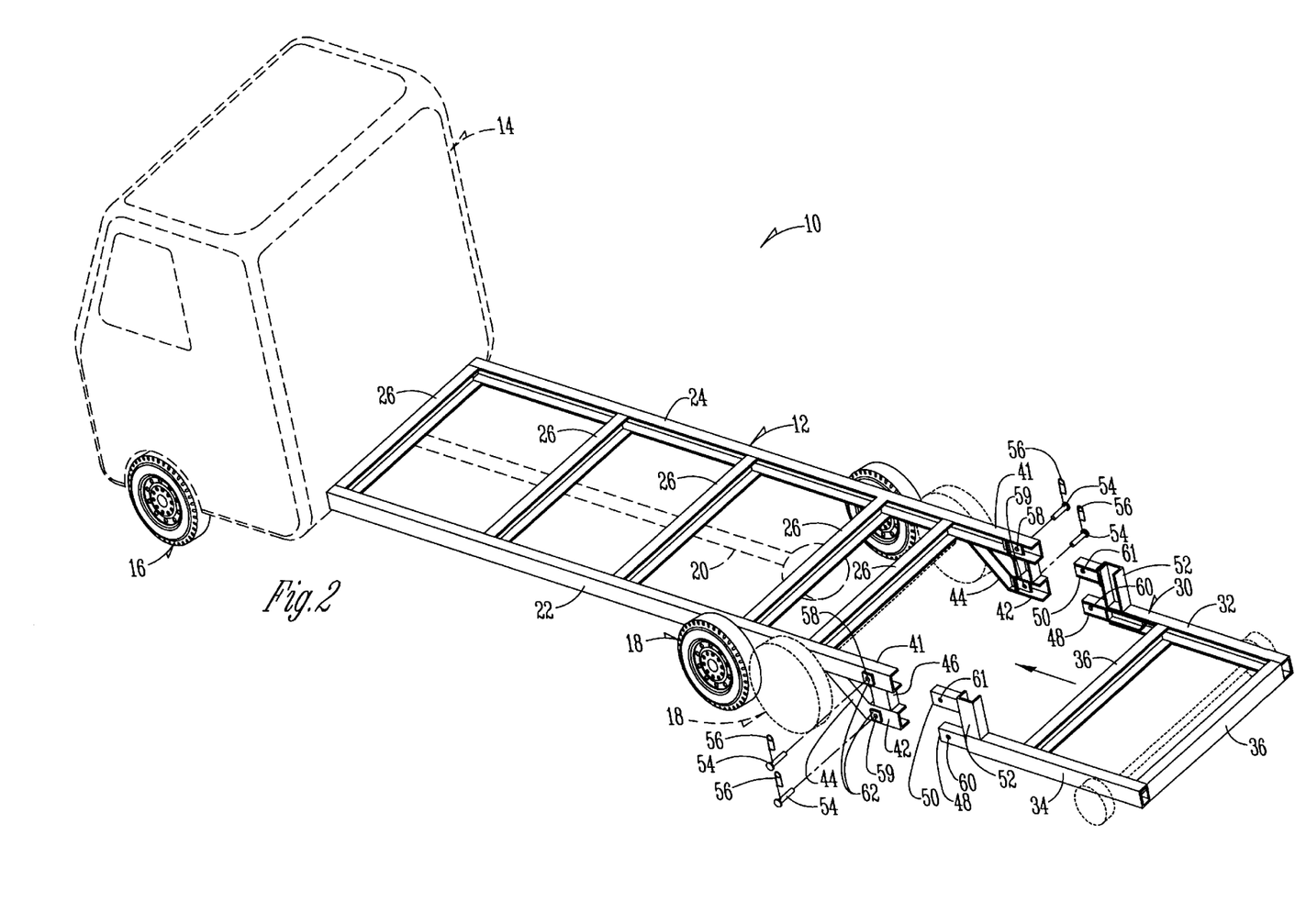
FIG. 2 is similar to FIG. 1 except showing the extended truck frame in an inverted position detached from the truck frame.

FIG. 2 is essentially the same as FIG. 1 but illustrates an advantage of extended frame 30. In FIG. 1, extended frame rails 32 and 34 when connected to frame 12 are generally in the same plane as frame rails 22 and 24 of frame 12. Therefore, the supporting platform or level, so to speak, of the entire frame 12 plus extended frame 30 is generally the same. Many times this is desired or advantageous. On the other hand, as shown in FIG. 2, the structure of extended frame 30 is such that it could be inverted from its position in FIG. 1 and attached to frame 12 by the same mechanism as described with regard to FIG. 1. However, the top side or plane of extended frame 30 would be at a lower level than the top side or plane of frame 12. Essentially this would provide a drop frame section for the entire combination which, as will be discussed later, can be desired and advantageous.

Figure 3:
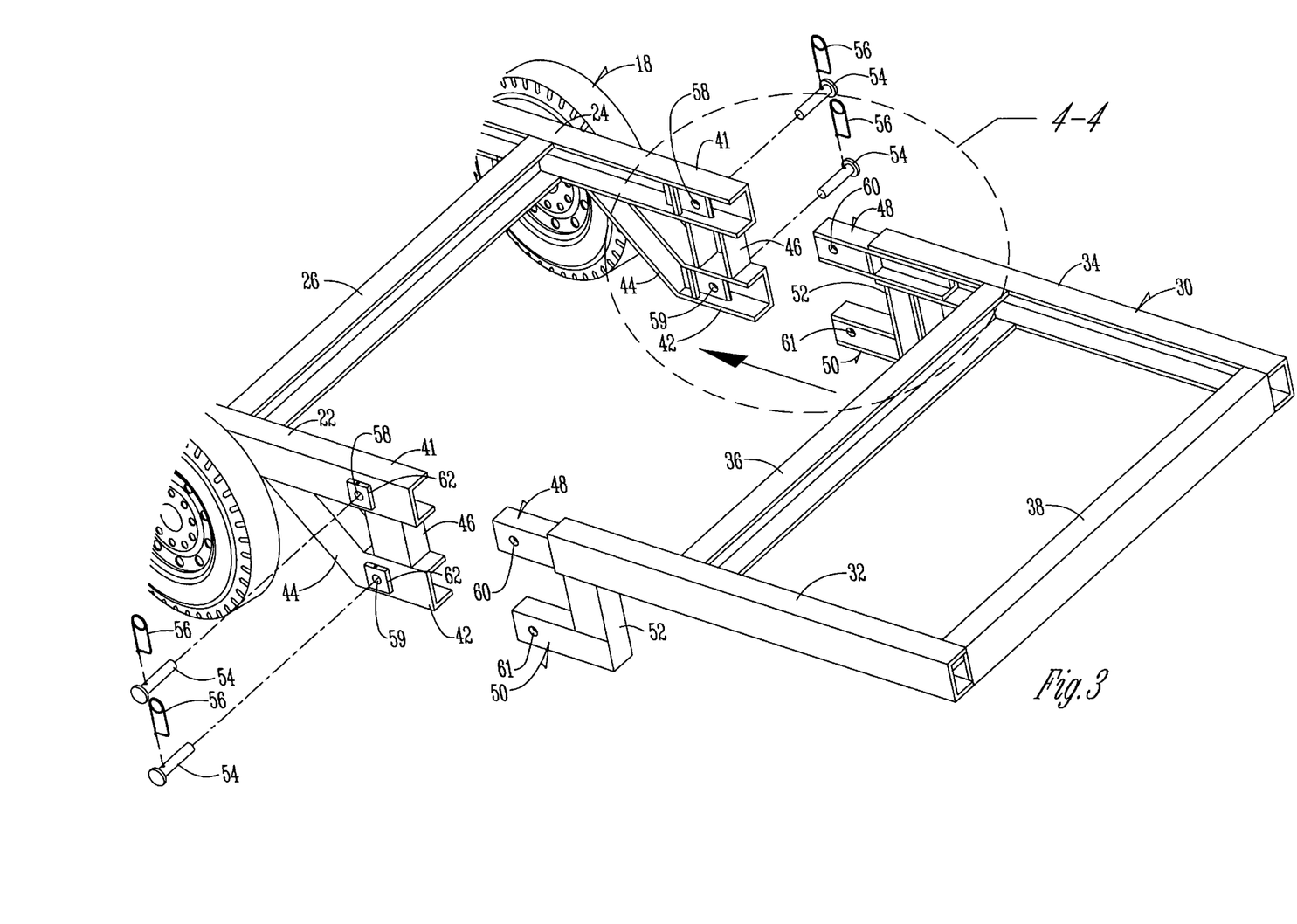
FIG. 3 is an enlarged partial perspective view of the rear of the truck and the extended frame similar to FIG. 1.
Figure 4A:
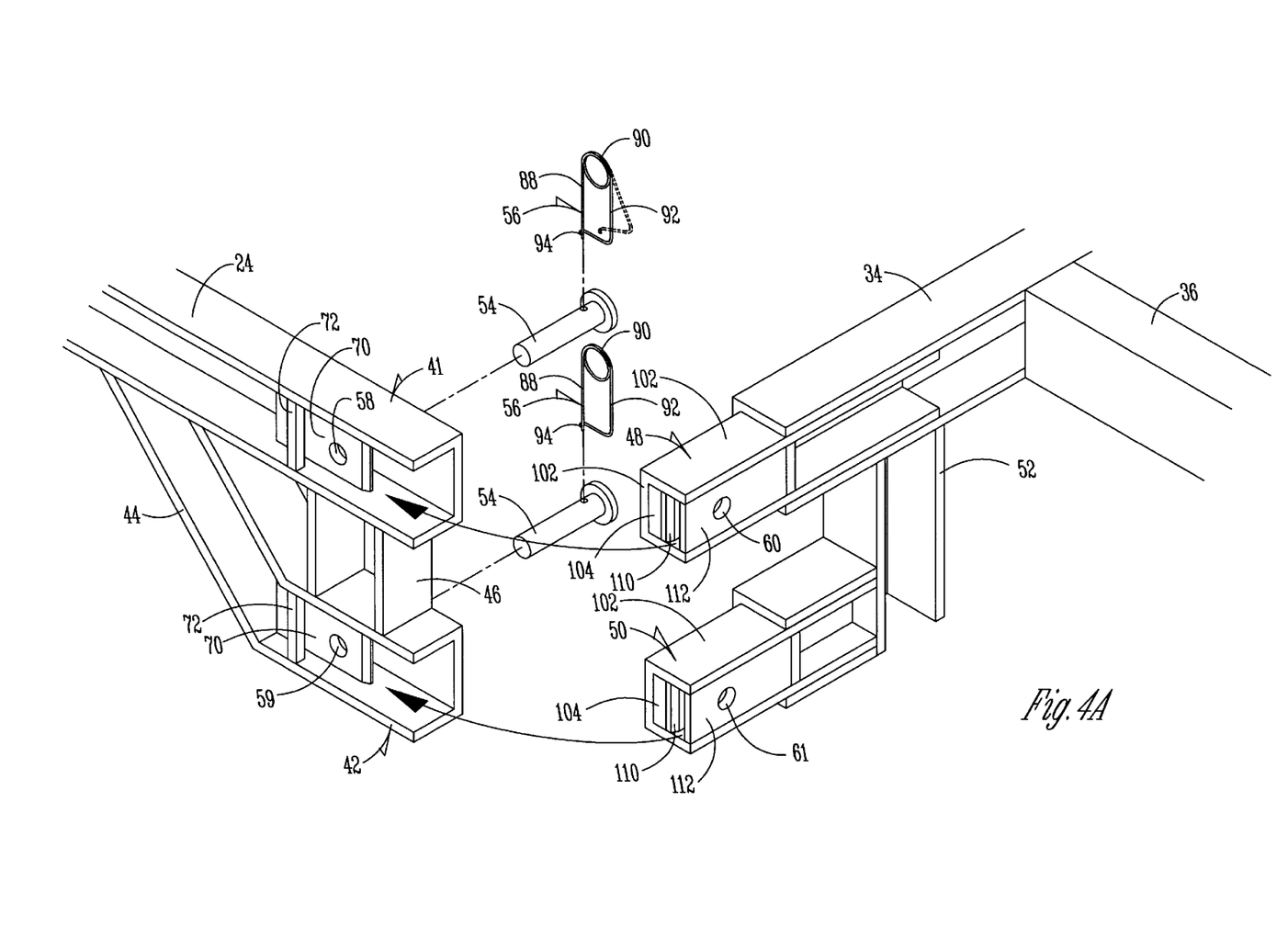
FIG. 4A is an isolated perspective view substantially of that portion of FIG. 3 indicated by line 4—4, showing in more detail, the structure of the connection between a truck frame and the extended truck frame according to the invention.
Figure 4B:
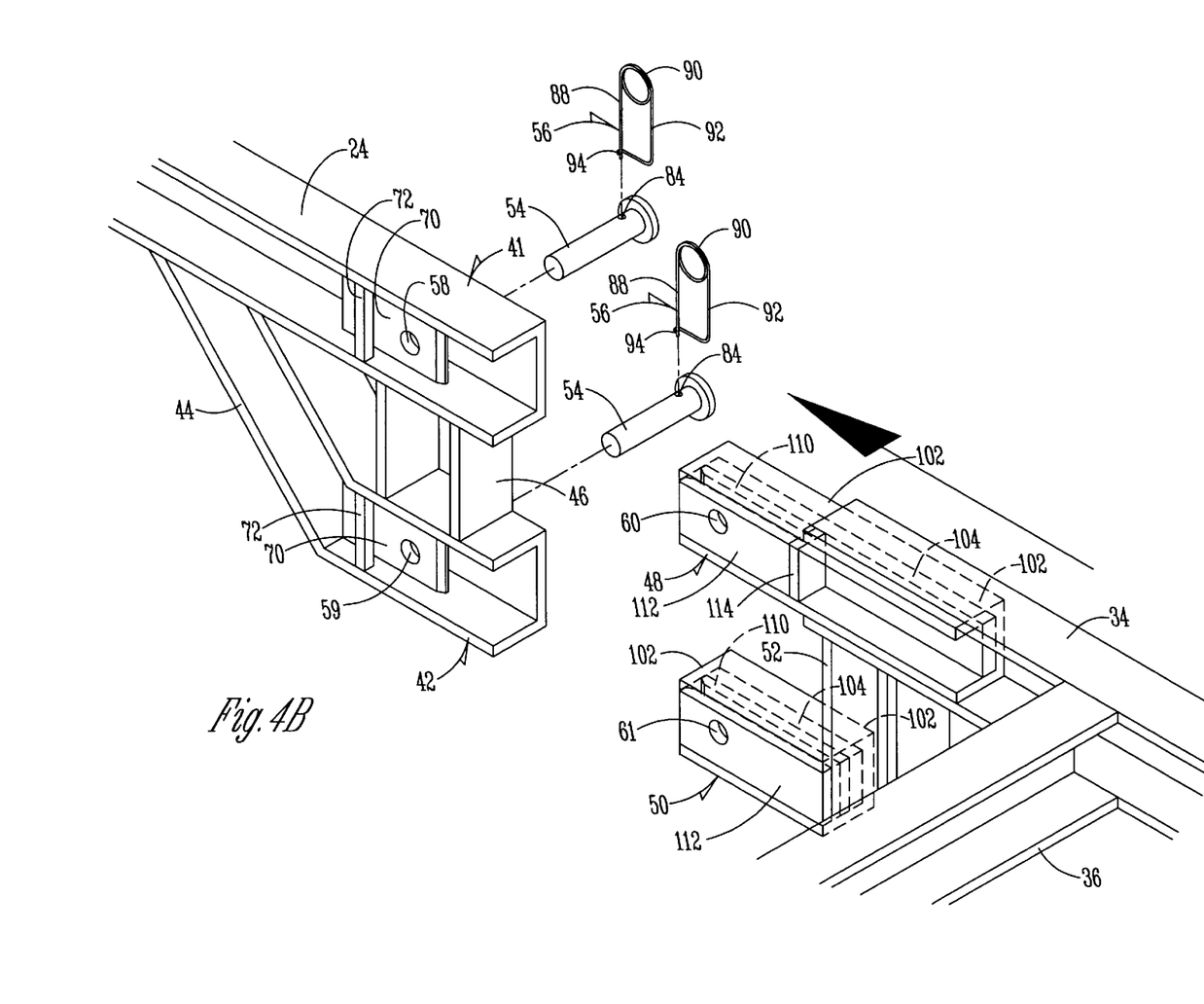
FIG. 4B is also similar to FIG. 4A showing in more detail of the connection portion of the extended truck frame.
Figure 5A:
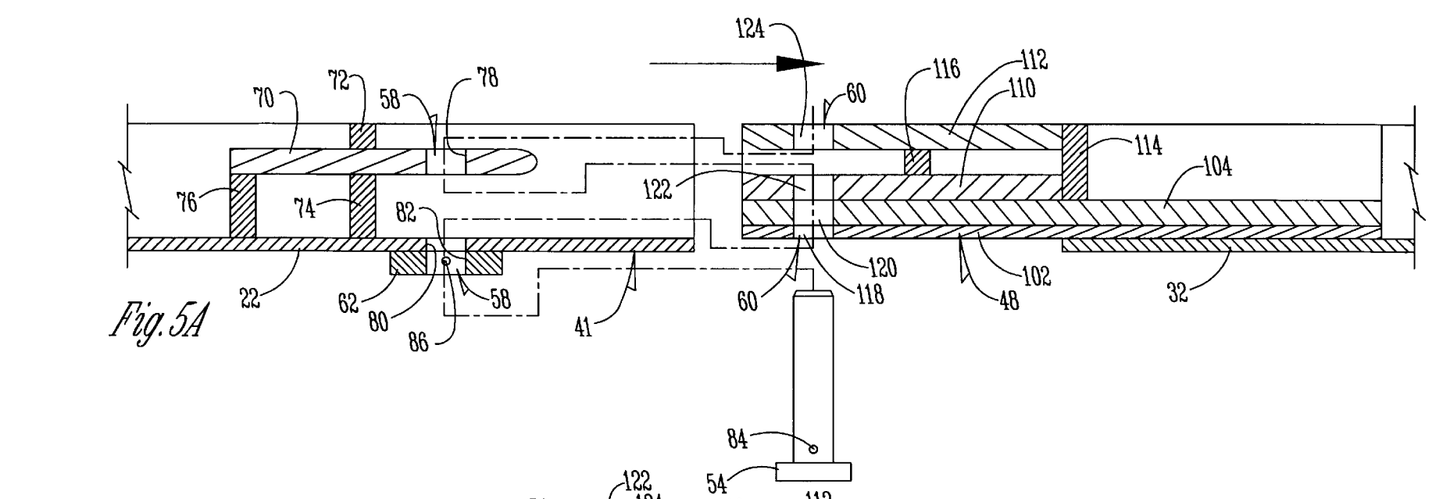
FIG. 5A is sectional view taken along line 5A—5A of FIG. 8.
Figure 5B:
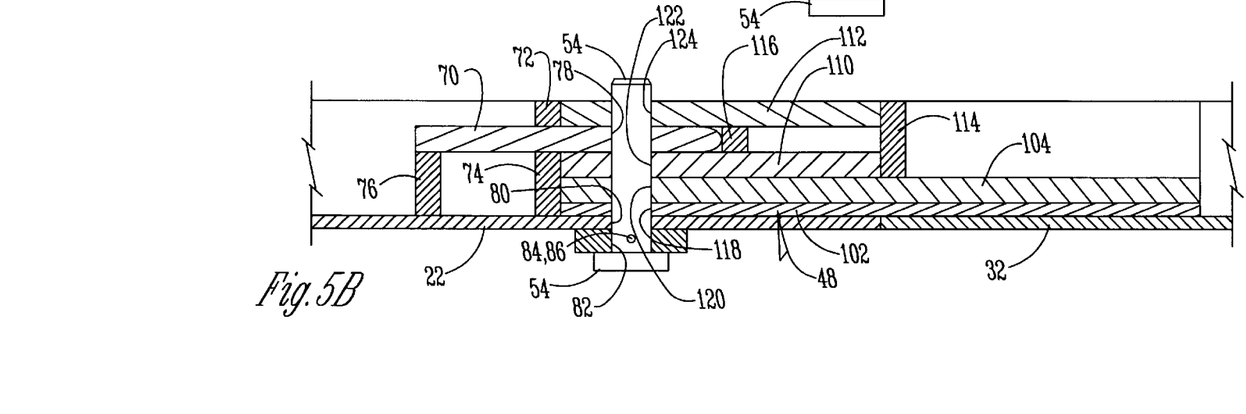
FIG. 5B is similar to FIG. 5A except showing the complete connection of the truck frame and the extender frame FIG. 5A.
Figure 6:
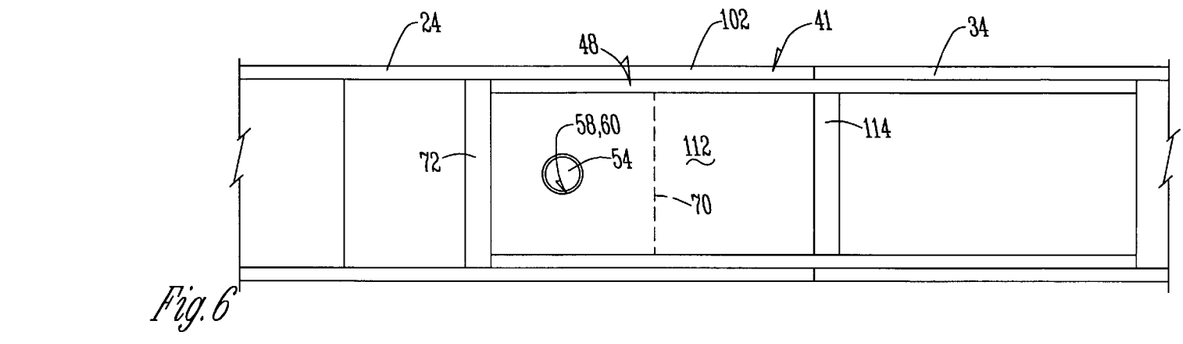
FIG. 6 is a side elevational partial view of FIG. 5B.
Figure 7:
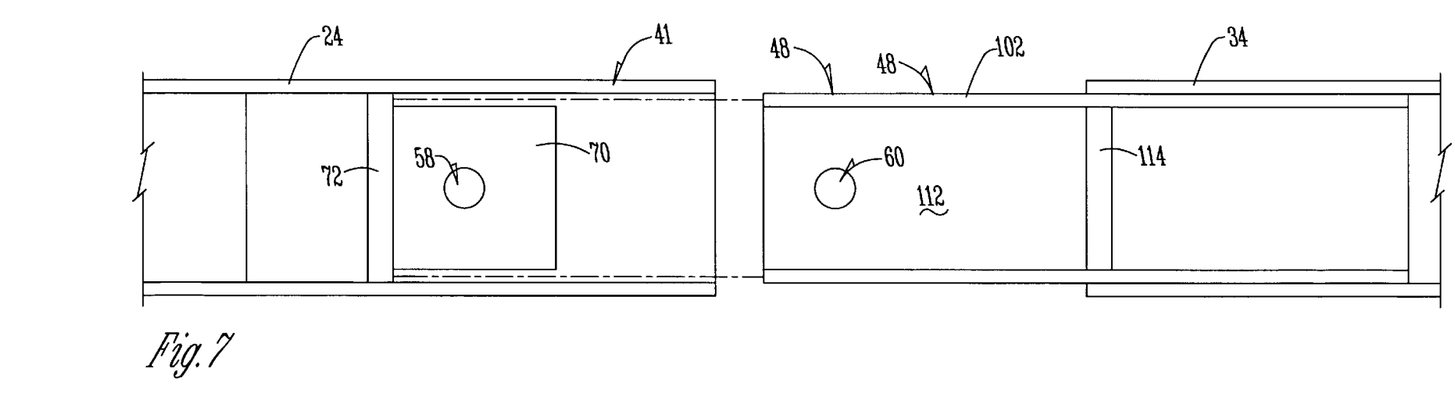
FIG. 7 is a side elevational partial view of FIG. 5A.

FIG. 3 illustrates in more detail the structure of extended frame 30. By referring to FIG. 3 in combination with FIGS. 4A, 4B, 5A, 5B, 6 and 7, the specific structure of the interconnection between frames 12 and 30 will described. It can be seen from the drawings that both sides of frame 12 and frame 30 are essentially the same. The rear end of frame rails 22 and 24 are C-shaped steel beams with the opened side facing inwardly. The rear end of truck frame 12 would be modified to include vertical plate 70 rigidly held in place by members 72, 74, and 76, inside the C-shaped of the frame rail. An aperture 78 is aligned with an aperture 80 in rail 22. Wear bushing 62, and its aperture 82, are aligned with apertures 78 and 80 and are along the outside of rail 22. Pin 54 has a small aperture 84 and when inserted through wear bushing 62 and vertical plate 70, aperture 84 aligns with an aperture 86 through wear bushing 62 (both top and bottom). The metal safety pin or lock 56, available from Hocol Machine, Ames, Iowa (and a variety of other vendors as an off-the-shelf product), is used to lock pin 54 in place. Safety lock 56 includes a straight portion 88 (see FIG. 4A), a spring portion 90, and a L-shaped portion 92 terminating in a hook 94. The L-shaped portion 92 can be pressed towards straight portion 88 and then moved so that hook 94 is released from around straight portion 88. Straight portion 88 can then be inserted through apertures 86 in wear bushing 62, and aperture 84 in pin 54 to lock pin 54 in place to the side of rail 22 (See FIG. 8).

The proximal ends (the male portions 48) of extension frame rails 32 and 34 include a structure that will mate into the rear ends 41 of frame rails 22 and 24. First, an extended portion shown generally at 48 (see especially FIG. 4A), consists of a C-shaped channel member 102 that is welded or otherwise rigidly secured into C-shaped frame member 34. A spacer 104 is welded or otherwise secured inside C-shaped channel 102. Parallel plates 110 and 112 (with beveled ends) are welded or otherwise secured inside channel 102 as shown and supported therein by pieces 114 and 116. Plates 110 and 112 are spaced apart a distance to receive vertical plate 70 (with beveled front edge) in frame rail 22. Note then that apertures 118, 120, 122, and 124 in the respective pieces in extended portion 48 are aligned. By particularly viewing FIG. 5B, it can be seen that when extended portion 48 is inserted into the rear of frame rail 22, the apertures just described (numbers 118, 120, 122, and 124) align with apertures 78, 80, and the aperture through wearing bushing 62, namely reference numeral 82), to allow pin 54 to be inserted therethrough.

By the above description, it can be seen that extended frame 30 with male members 48 can be slid into receiving portions 41 at the back of truck frame 12. Essentially the same structure can be utilized for the lower male members 50 and lower or bottom receivers 42. Two pins 54, for each side the entire frame, can then be used to secure the frame 30 in place in the frame 12.

It is pointed out that the structure described above provides added structural support at the end of truck frame 12, and in extended frame 30, at the point of junction of the two frames 12 and 30, to provide sufficient rigidity and strength for such a connection.

Figure 8:
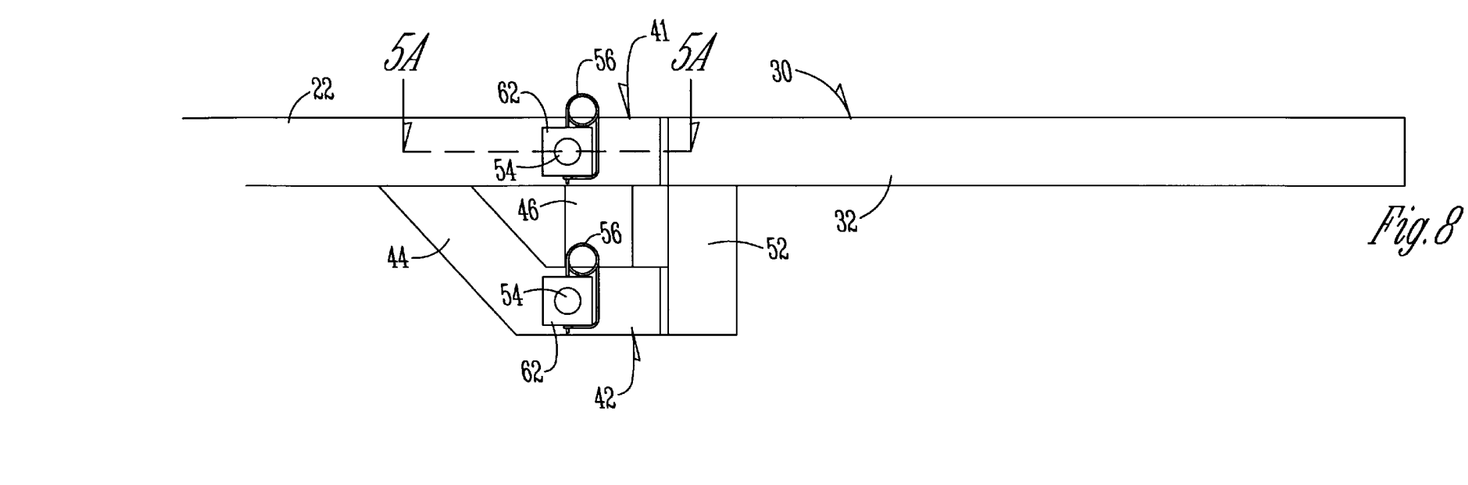
FIG. 8 is a simplified side elevational partial view of the rear of the truck frame FIG. 1 with the extended frame attached.
Figure 9:
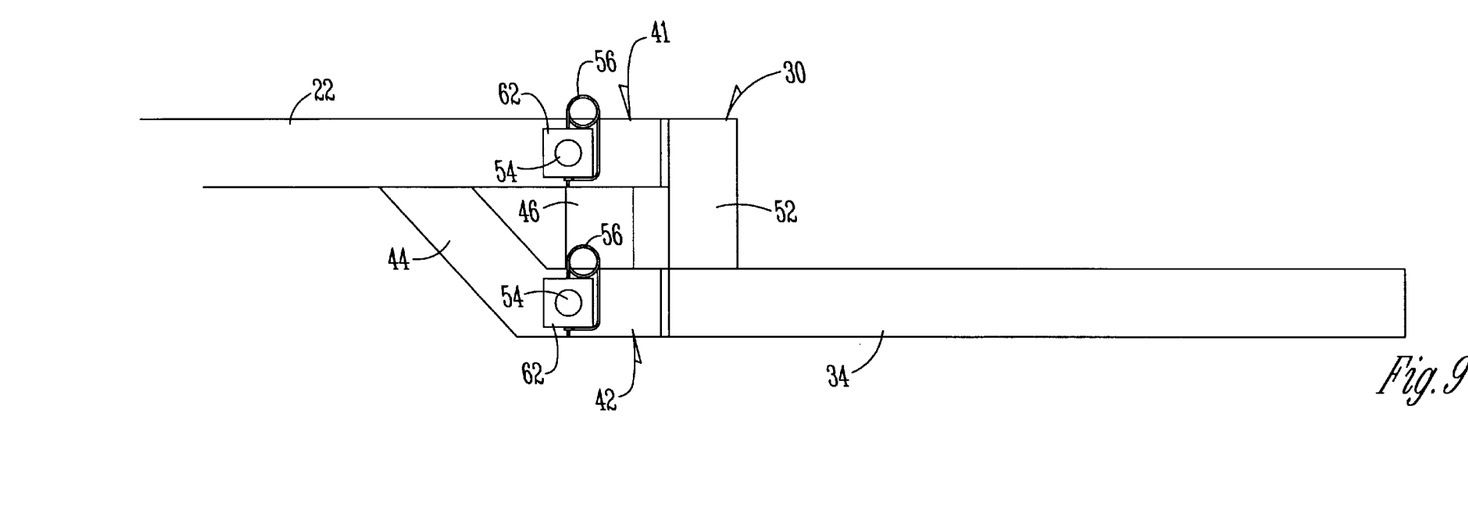
FIG. 9 is a simplified side elevational view of the truck frame of FIG. 2 with the extended frame attached.

As shown in FIGS. 8 and 9, an advantage of extended frame 30 is the ability to have its top surface at the level of the top surface of frame 12 (FIG. 8), or at a lower level (FIG. 9). Further can be advantageous in certain instances.

Figure 10:
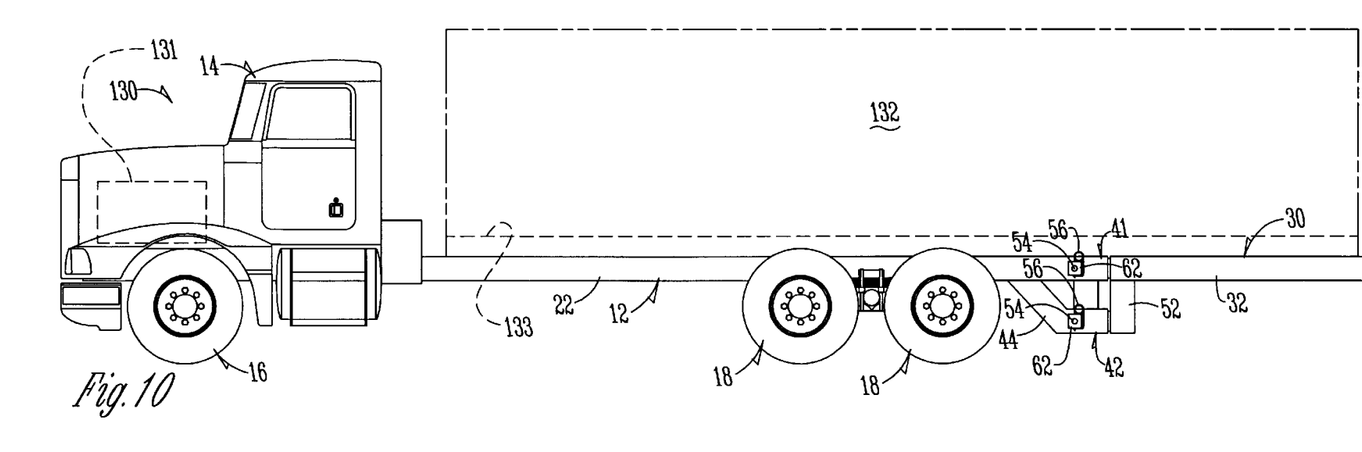
FIG. 10 is a side elevational view of a straight truck with an extended frame such as illustrated in FIG. 8 attached, illustrating an extended box that can be carried by said truck.

For example, by referring to FIG. 10, a large straight truck 130 with frame 12 and double rear axles and wheels, engine 131, and flatbed 133, could utilize an extended frame 30 such as FIG. 8 to have an increased volume box 132.

Figure 11:
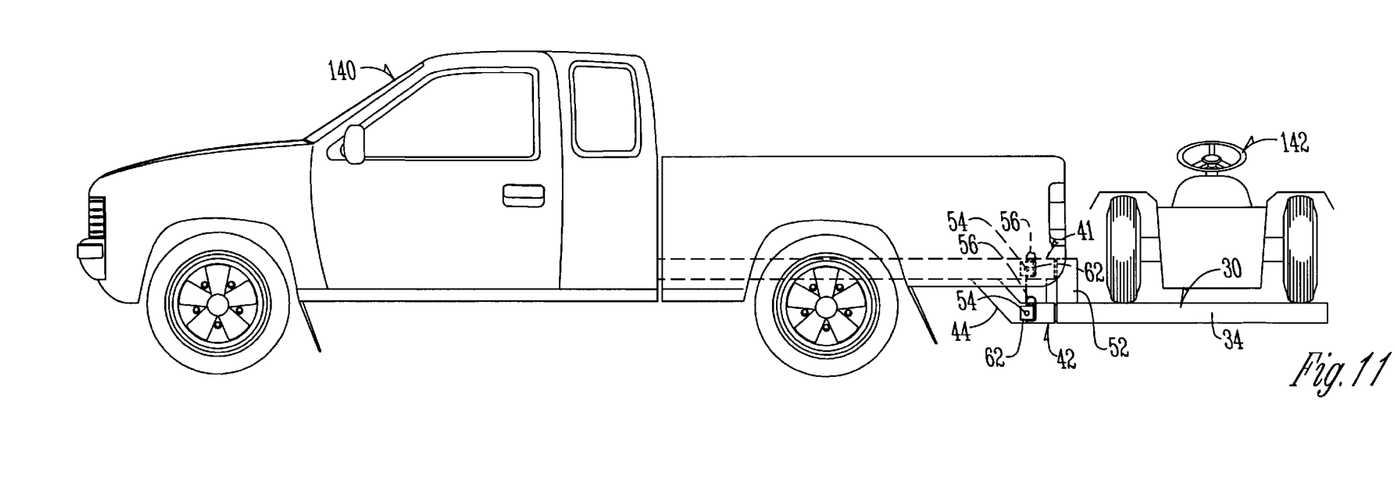
FIG. 11 is a side elevational view of an extended frame similar to that shown in FIG. 9, showing a lower carrying level for the extended frame relative to the truck frame, in this case a pick-up, carrying a lawn tractor on the extended frame.

By comparison, pick-up truck 140 in FIG. 11 could utilize the extended frame 30 in the inverted orientation of FIG. 9 and have a flat bed thereon to support a lawn tractor 142. As can be appreciated, the lower level of extended frame 30 in FIG. 11 would make it easier to load and unload lawn tractor 142, as opposed to the level of the pick-up bed. An additional benefit is that it eliminates driving the lawn tractor 142 into the pick-up bed which would deter scratches, dents, or other wear or damage over time to pick-up 140.

Figure 12:
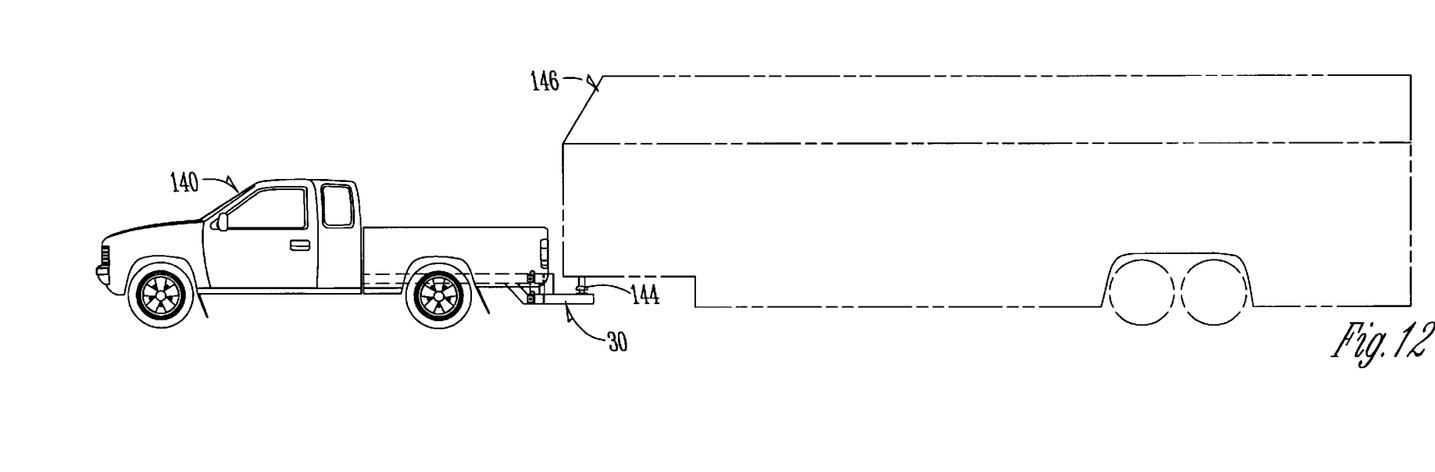
FIG. 12 is a side elevational view showing an extended frame such as FIG. 11, but with a receiver for connection to a fifth wheel trailer.

Still further, pick-up 140 (see FIG. 12) with extended frame 30 such as shown in FIG. 9, could include a hitch 144 which essentially would allow a large trailer 146 to be attached. One example would be a fifth wheel type arrangement. Again this would free up the pick-up bed for cargo and would minimize any damage or wear to the pick-up bed. It would also allow for the avoidance of having to install a hitch into the pick-up bed but rather allows the releasable extended frame 30 to be quickly attached or detached depending on whether trailer 146 is to be pulled. A rear bumper (not shown) could be mounted in a fashion so that the truck rear bumper could be quickly installed or removed as needed.

Other examples of uses of extended frame 30 abound. For example, some type of spreader box for road de-icing material could be placed on an extended frame 30, especially in the form of FIG. 9, to get the spreader box near to the ground. Such a spreader box is only used some of the time and therefore the removable extended frame 30 could support it but at other times both the spreader box and frame 30 could be removed so that the truck is available for other uses.

On a larger scale, an extended frame 30 could be used to provide additional carrying. It could also provide for a longer box for a snow plow truck for snow removal. As was discussed previously, short boxes are frequently put on snow plows because of the weight of sand. However, if the dump box is used for hauling away snow, the truck could handle a greater volume of snow than sand if a larger box where used. The extended frame 30 could function accordingly and increase the flexibility of such a truck, even during the snow season.

A normal dump box on a snow plow with a single axle can be around ten foot long with about 14" to 18" tall sides. With the present invention, it is anticipated that the box length could be extended perhaps to 20 to 24 feet with 3½' to 4' sides for snow removal. This would possibly allow 2 to 3 times as much snow to be hauled, if another axle was utilized with extended frame 30.

Other possible uses for extended frame 30 would be to include a piece of powered equipment, such as a rotatory round broom, that could be used to sweep or clean off parking lots or roads. It could be used on either a larger truck or on a smaller truck. For some applications, extended frame 30 could be used at the back of a pick-up to carry a large round hay bale (approximately 1,500 lbs. per bale) in a efficient manner. An extra axle placed on the extended frame would probably be used. For example, smaller trailer axles are available from a variety of venders and those skilled in the art could attach them to the extended frame. A mower deck could be mounted or extend from extended frame 30 to mow the shoulders of roads, as a further example.

Still further examples would be the ability to manually loads supplies onto a deck height that is substantially lower than a pick-up bed body. For example it would much less strenuous to load construction materials that could be carried by a pick-up only 1 to 1½ feet off the ground rather than approximately 30" tailgate height or 4', for example, which occurs when loading such materials over the pick-up bed sidewalls.

Such an extended frame might be advantageously used for carrying hot mix in city, county or state vehicles. (Pickup trucks or large road construction trucks.) A hot mix (asphalt patch) container could be placed closer to the ground at the back of the vehicle instead of requiring workers to reach into the truck bed for the same. Another example would be for the delivery of appliances. Again the lower deck height available would make it easier to load and unload, perhaps allowing one person with a dolly, as opposed to two, to load and unload appliances and deliver them, which represents a savings in labor costs. It would also avoid scratching or damaging the truck body.

Any number of other examples exist as may be obvious or within the skill of those skilled in the art.

It will be appreciated that the present invention can take many forms and embodiments. The true essence and spirit of this invention are defined in the amended claims, and it is not intended that the embodiments of the invention presented herein should limit the size thereof.

Figure 13:
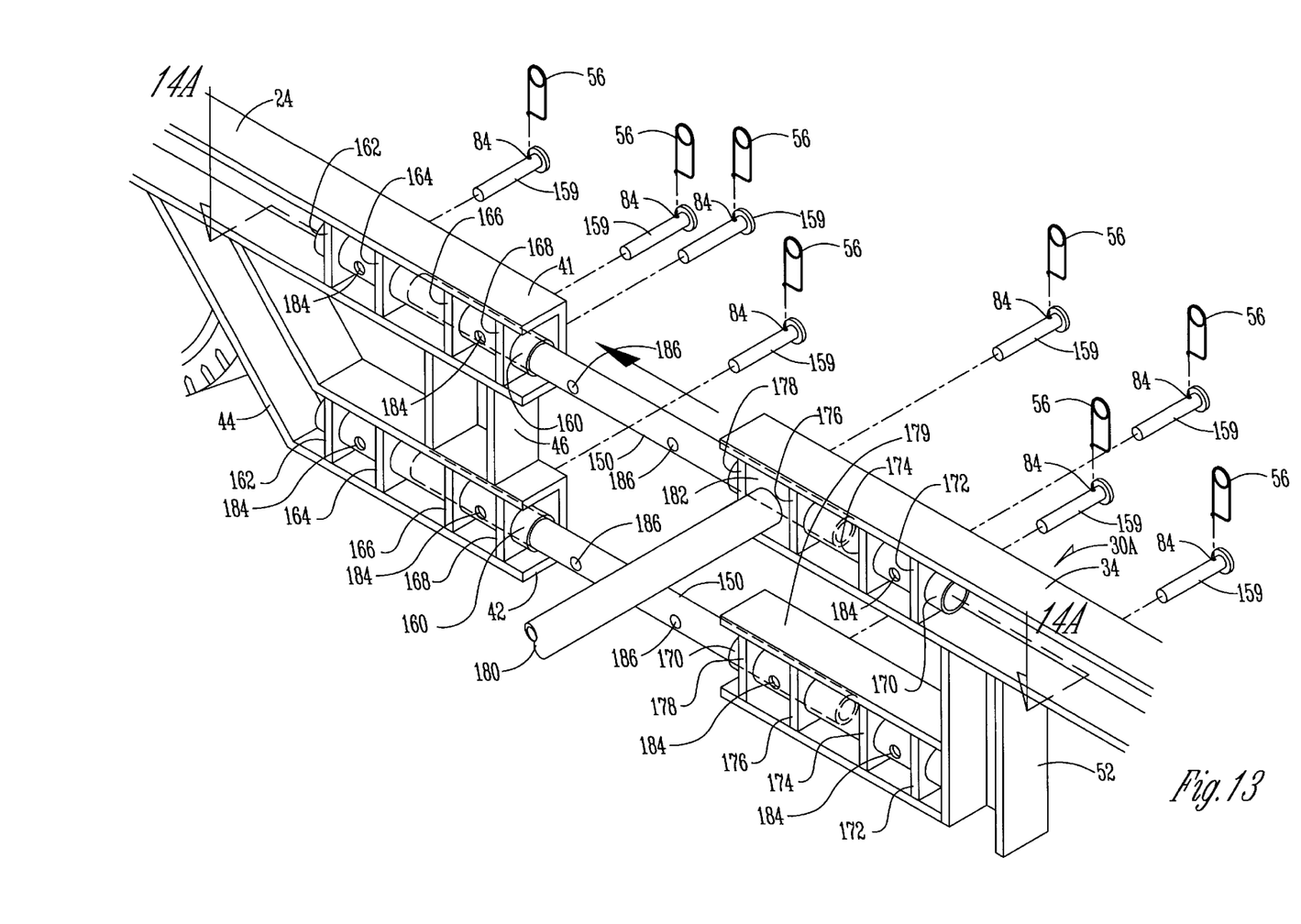
FIG. 13 is a partial perspective view of an alternative embodiment of a connection to a truck frame and an extended frame, showing the extended frame in a partially connected configuration.
Figures 14A, 14B:
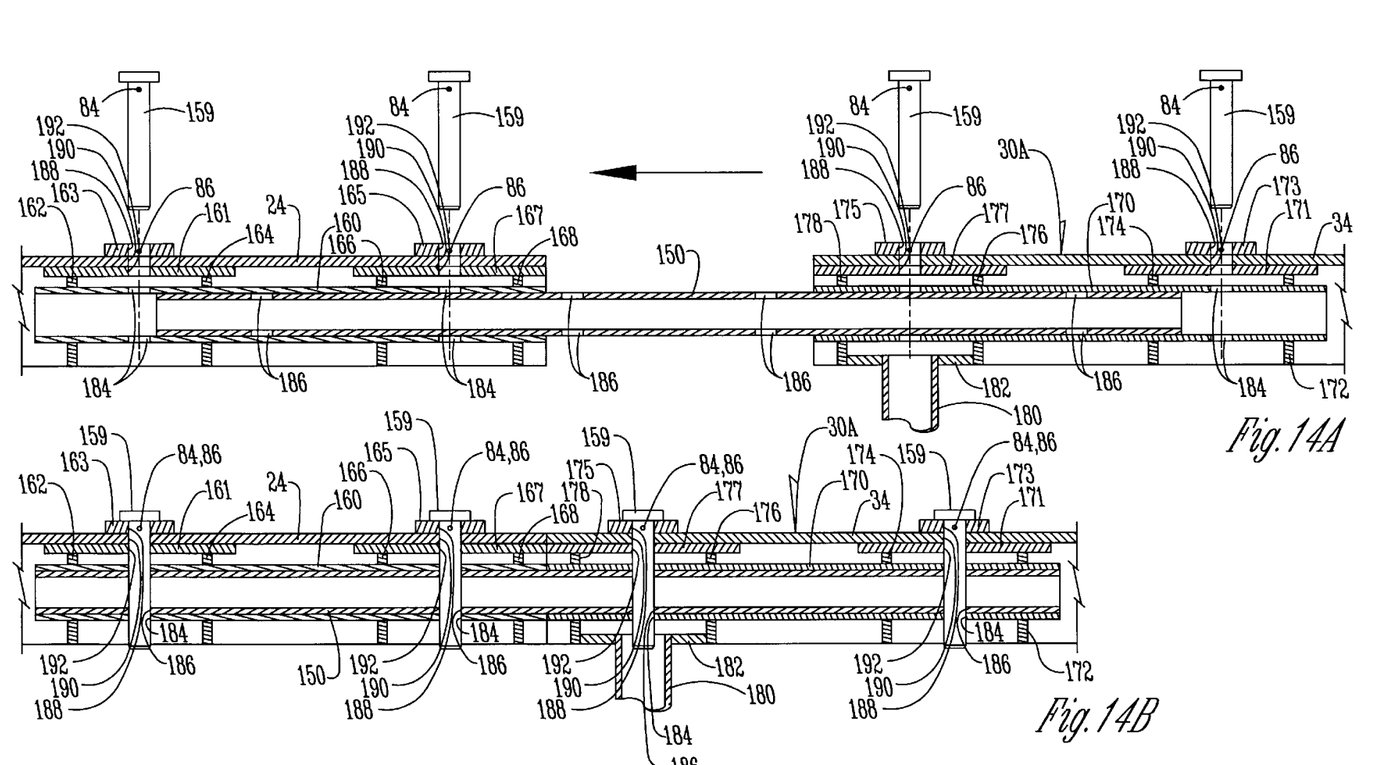
FIG. 14A is a sectional view taken generally along lines 14A—14A of FIG. 13.
FIG. 14B is similar to FIG. 14A but illustrates the truck frame and extended frame in a fully connected position.

For example, FIGS. 13, 14A, and 14B show an alternative arrangement for an interconnecting truck frame 12 and extended frame 30A. The arrangement shown in these drawings is similar to that shown in the previous drawings except for the following differences. Instead of utilizing C-shaped channel members and having a male mating portion extending from the extended frame rails 32 and 34, tubular members 160 and 170 could be fixedly mounted in both the rear of truck frame 12 and in the proximal end of extended frame 30A. Tubes 160 could be mounted in ends 41 of truck frame rails 22 and 24, as well as in ends 42 which, like the embodiment of FIGS. 1–12, have been added beneath rails 22 and 24. Tubes 170 are mounted in extended frame rails 32 and 34, as well as in C-shaped members 179, which are similar to members 50. Interconnection of the tubular members 160 and 170 could take place by what will be called interlink tubes 150 (completely removable) that can be mateably inserted into adjacent ends of tubes 160 and 170 fixed in the frames 12 and 30A. Interlinks 150 would slide into tubes 160 and 170. When the frames 12 and 30A are then brought together, appropriate apertures would align to allow pins 159 to be inserted therethrough and locked in place by locks 56. Essentially, interlinks 150 provide structural communication and a unitary structural member that spans the joint between frames 12 and 30A when assembled.

Specifically, as can be seen in FIGS. 13 and 14A and B, frame 12 would have tubes 160 supported in rectangular supports 162, 164, 166, and 168. Likewise extension 30 would have tubes 170 supported in rectangular supports 172, 174, 176, and 178. Structural members 171 and 177, as well as 161 and 167, could be placed on the inside of frame extension 30A and truck frame 12, respectively, in combination with the supporting structure, as shown in FIG. 14A. Wear bushings (e.g. metal linings) 163, 165, 173, and 175 could be on the outside of the respective frames and/or inside of tubes, and apertures would align between tube 150 (see apertures 186), tubes 160 and 170 (see apertures 184 and 186), and the other structure (see apertures 188, 190, 192) so that pins 159 could be put in place and locked down (see FIG. 14B) as previously described with regard to the prior embodiment.

One other option regarding the embodiment of FIGS. 13 and 14 is that extension frame 30A could have interconnecting or cross members 180 which could simply be welded into place into a rectangular plate 182 that could be supported by two plates 176 and 178 used to support tube 170. This is a economical utilization of the existing structure that also supports tube 170.

One advantage of the embodiment of FIG. 13 is that it may be easier and more economical to manufacture and assemble such an arrangement and it might provide more structural strength.

Therefore, as with the embodiment of FIGS. 1–12, the embodiment of FIGS. 13, 14A and 14B has upper and lower receivers (tubes 160 in parts 41 and 42) for both sides of truck frame 12. Instead of corresponding upper and lower male members, upper and lower receivers (tubes 170) in extension rails 34 and lower members 179 are used. The independent, completely removable interlinks 150 slidably fit into corresponding receiver pairs 160/170. Pins 159 can lock interlink 150 into either one of receivers 160 or 170 first and then the other, when extended frame 30A is brought into abutment with truck frame 12, or are can partially pin interlink 150 to either side or wait until frame 30A is abutted to frame 12 to insert any pins 159 in place.

Other options include the following, which are not exhaustive. An extended frame 30A could include one or more additional axle/wheel combinations, which could be removable from frame 30A and used as needed (see, eg., FIG. 1). Such axles could be adjustably positionable along frame 30A according to need or desire.

Frame 30A is invertable according to need or desire.

The size, material, and connection method for frame 30A and its interconnection with its pieces can vary and are within the skill of those skilled in the art.

What is claimed is:

1. A truck frame extender comprising:

extender rails spaced apart from one another and having proximal and distal ends;

cross members between the extender rails;

proximal ends of the extender rails including connectors for releasable connection to a truck frame;

further comprising second connectors at the proximal ends of the extender rails, spaced apart from said connectors, the second connectors positioned away from a plane defined by the extender rails;

wherein the first and second connectors can be reversably positioned into mating connectors adapted to be mounted to a truck frame so that the extender rails can either be positioned generally at the level of a plane defined by truck rails, or at a different plane.

2. The apparatus of claim 1 wherein the connectors comprise male members configured to mate into female receivers in a truck frame.

3. The apparatus of claim 2 wherein the female receivers comprise frame rails of a truck frame.

4. The apparatus of claim 3 wherein the truck frame rails are strengthened by strengthening members.

5. The apparatus of claim 1 wherein the connectors comprise receivers, interlinks which are removably positionable into the receivers at first ends, the interlinks having second ends which are configured to be removably positionable into similar receivers in the truck frame.

6. The apparatus of claim 1 wherein the cross members support and hold rigid the extender rails.

7. The apparatus of claim 1 further comprising an axle and wheels attached to the extender rails.

8. The apparatus of claim 1 further comprising a working body connected to the extender rails.

9. The apparatus of claim 8 wherein the working body comprises a flatbed.

10. The apparatus of claim 8 wherein the working body comprises a box.

11. The apparatus of claim 1 wherein the extender rails can be positioned in a plane beneath the plane of truck rails.

12. A truck with an extendible frame comprising:

a truck frame including C-shaped parallel rails from front to back of the truck;

a truck body connected to the truck frame;

an engine and drive train operably positioned in the truck frame;

an axle and wheels operatively connected to the drive train and truck frame;

the rear of the truck rails each comprising a receiver fixed to the rails and defining a female receptor having a length, the receivers comprising tubular members inserted and securable into the C-shaped parallel rails;

releasable members operating with the receivers to releasably secure an extended frame to the truck rails.

13. The truck of claim 12 wherein the truck comprises a pick-up truck.

14. The truck of claim 12 wherein the truck comprises a straight truck of several or more tons in rating.

15. The truck of claim 12 further comprising an extended frame attached to the frame rails.

16. The truck of claim 15 wherein the extended frame comprises parallel rails having front ends.

17. The truck of claim 16 wherein the front ends of the parallel rails have male portions complimentarily insertable in the female portions in the truck frame rails.

18. The truck of claim 16 wherein the front ends of the extended frame rails comprise receivers which receive interlinks between receivers.

19. The truck of claim 12 further comprising a second set of receivers spaced below from said receivers.

20. The truck of claim 19 wherein the extended frame includes second mating portions below first mating portions.

21. The truck of claim 20 wherein the first and second mating portions of the extended frame are reversible relative to the receivers on the truck frame.

* * * * *